US005677504A

United States Patent [19]

Kurata

[11] Patent Number: 5,677,504

[45] Date of Patent: Oct. 14, 1997

[54] TONE SIGNAL GENERATOR

[75] Inventor: Mitsuhiro Kurata, Hamamatsu, Japan

[73] Assignee: Yamaha Corporation, Hamamatsu, Japan

[21] Appl. No.: 414,906

[22] Filed: Mar. 31, 1995

[30] Foreign Application Priority Data

Mar. 31, 1994 [JP] Japan .................................... 6-062562
Mar. 31, 1994 [JP] Japan .................................... 6-062565

[51] Int. Cl.$^6$ .................................. G10H 7/00; H04J 3/00

[52] U.S. Cl. .................................. 84/617; 84/603; 84/624; 84/627

[58] Field of Search .............................. 84/603, 615, 617, 84/624, 627, 653, 655

[56] References Cited

U.S. PATENT DOCUMENTS 4,703,680 11/1987 Wachi et al. .............................. 84/615
5,038,661 8/1991 Kaneko ................................. 84/622 X
5,383,386 1/1995 Kudo et al. .............................. 84/622
5,446,237 8/1995 Abe et al. ................................ 84/617

*Primary Examiner*—William M. Shoop, Jr.
*Assistant Examiner*—Jeffrey W. Donels
*Attorney, Agent, or Firm*—Loeb & Loeb LLP

[57] ABSTRACT

A tone signal generator includes a plurality of tone generation channels, and a tone generation control data memory for storing instruction data for instructing tone generation or tone release and execution data for instructing execution thereof, for each tone generation channel. The tone signal generator also includes an execution device for executing the tone generation. The execution device executes the tone generation or the tone release for each tone generation channel at an assigned timing in the sampling cycle to the tone generation channel when the instruction data is written in the tone generation control data memory corresponding to the tone generation channel, and then the execution data is written in the memory corresponding to any tone generation channel. After the writing of the instruction data, the executing data is written into the memory. This executing data triggers the tone generation of channels where the instruction data has already been written. As a result, the tone generation in multi-channels is performed at the same time.

10 Claims, 6 Drawing Sheets

FIG.7A

| TONE GENERATION CHANNEL | MDXSL | MDYSL |
|---|---|---|
| 0 | — | — |
| 1 | 0 | — |
| 2 | 1 | — |
| 3 | 2 | - |

FIG.7B

| TONE GENERATION CHANNEL | MDXSL | MDYSL |
|---|---|---|
| 0 | — | — |
| 1 | — | — |
| 2 | 0 | 1 |
| 3 | 2 | - |

FIG.7C

| TONE GENERATION CHANNEL | MDXSL | MDYSL |
|---|---|---|
| 0 | 0 | — |
| 1 | 0 | — |
| 2 | — | — |
| 3 | 1 | 2 |

TONE SIGNAL GENERATOR

BACKGROUND OF THE INVENTION 1. (Field of the Invention)

The present invention relates to a tone signal generator which has a plurality of channels for tone generation, and particularly to a tone signal generator which generates a musical tone signal by a way of Frequency Modulation.

2. (Description of the Prior Art)

Musical tone signal generators with multi channels in practical use which have a plurality of channels for tone generation are provided with registers for every channel for storing instruction data for starting the tone generation. When the tone generation of signal data, such as musical tone signal data and modulation data (an operator in Frequency Modulation tone signal generators), to a channel is instructed, a CPU or the like sets instruction data for a start of modulating into the register corresponding to the channel, and thereby a musical tone generation circuit starts generating the signal data.

In the case of generating the signal data simultaneously in a plurality of channels, the instruction data is set into the registers corresponding to the channels.

The CPU or the like processes data sequentially, so it is impossible to simultaneously set the instruction data into the registers of the channels to be generated. Further, it is required to set more data than the instruction data into other registers of the channel to actually start generating the signal data. Therefore, the instruction data is set for each channel, and the first of the tone generation is instructed for each channel. As a result, a large delay may be caused between the first tone generation timing instructed first and the final tone generation timing instructed last.

This type of delay may not cause so much of a problem in the case that each channel individually generates the musical tone signal data. However, in the Frequency Modulation tone generation, in which a plurality of channels are combined by a specified algorithm to generate the musical tone signal data, for example, signal data of a channel is frequency-modulated by signal data of another channel, each signal wave data generated in each channel is different from one another, and it may have a bad influence to a tone color.

Another type of the prior tone signal generator is provided with only one register which is connected to a plurality of channels, and when the instruction data is set into the register, the plurality of channels simultaneously start generating. However, there are disadvantages such that an algorithm is fixed for generating, so there is no flexibility, and the channels are not effectively used.

SUMMARY OF THE INVENTION

It is therefore an object of the present invention to provide a tone signal generator which is capable of tone generating and releasing simultaneously at a plurality of channels.

It is another object of the present invention to provide a tone signal generator in which there is no limitation on algorithm constitution of tone generating.

It is a further object of the present invention to provide a tone signal generator which is capable of constituting any desired algorithm.

In accordance with an embodiment of the present invention, a tone signal generator comprises a plurality of tone generation channels to be processed in tone generating within one sampling cycle of the tone generating, tone generation control data memory means for storing tone generation control data, which includes instruction data for instructing tone generation or tone release and execution data for instructing execution thereof, for each tone generation channel, tone generation control data writing means for writing the tone generation control data into the tone generation control data memory means, and execution means for executing the tone generation or the tone release for each tone generation channel at an assigned timing, in the sampling cycle, to the tone generation channel, when the instruction data is stored in the tone generation control data memory means corresponding to the tone generation channel, and the execution data is stored in the tone generation control data memory means corresponding to any tone generation channel. All of the tone generation channels are processed for tone generation within one sampling cycle.

In the tone generation control data memory means, the instruction data is written before the tone generating, but the instruction data doesn't directly mean the executing of the tone generating. After the writing of the instruction data, the executing data is written into the tone generation control data memory means. This executing data triggers the tone generation of channels where the instruction data has already been written. As a result, the tone generation in multi-channels is performed at the same time.

In another embodiment of the present invention, a tone signal generator comprises wave data memory means for storing wave data, a plurality of tone generation channels to be processed in tone generating within one sampling cycle of the tone generating, address data generating means for generating address data of the wave data memory means, wave data read means for reading the wave data for each tone generation channel by accessing the wave data memory means with the address data generated by the address data generating means, and for outputting the read wave data as tone signal data, tone signal data memory means for temporarily storing the tone signal data, and address modulating means for modulating the address data generated by the address data generating means by the tone signal data stored in the tone signal data memory means.

In the above constituted embodiment, the address data is modulated by the tone signal data which is temporarily stored, so that the read wave data from the wave data memory is modulated by the previously read wave data. As a result, a Frequency Modulation process is simply carried out, and any desired algorithm of the Frequency Modulation process can be realized.

BRIEF DESCRIPTION OF THE DRAWINGS

FIG. 7 (FIGS. 7A to 7C) indicates a setting example of a table of the internal registers, MDXSL, and MDYSL.

DETAILED DESCRIPTION OF THE PREFERRED EMBODIMENT

Figure 1:
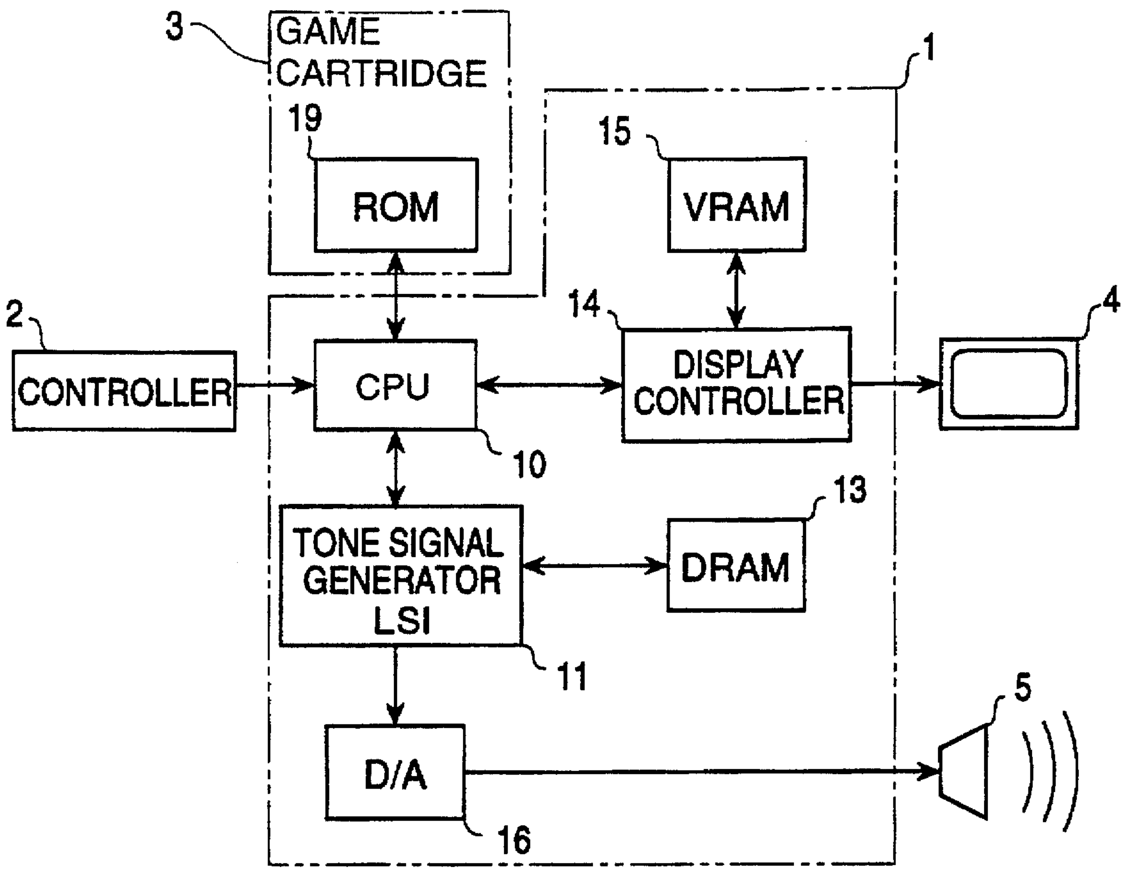
FIG. 1 is a block diagram of a game instrument to which a tone signal generator LSI is utilized embodying the present invention.

FIG. 1 is a block diagram of a TV game instrument, to which a tone signal generator LSI is applied, embodying the present invention.

A display 4 and a speaker 5 are connected to a game instrument 1. The display 4 and the speaker 5 can be ones installed into a normal TV receiver. To the game instrument 1, a game cartridge 3 having a ROM 19 in which a game program is stored and a controller 2 for a player to play a game are also connected. The controller 2 is connected to the game instrument 1 through a cable or the like, and the game cartridge 3 is set into a slot mounted in the game instrument 1.

The game instrument 1 is equipped with a CPU 10 which controls a whole program of the game progress. To the CPU 10, the controller 2, the ROM 19 mounted into the game cartridge 3, a display controller 14 for controlling the display 4 and a tone signal generator LSI 11, for generating tone signals, such as musical tone signals, with sound effects and musical tones as background music, are connected. A DRAM 13 in which PCM wave data or the like is stored, and a D/A converter 16, for converting generated musical tone data into analog musical tone signals, are connected to the tone signal generator LSI 11. The speaker 5 is connected to the D/A converter 16. A VRAM 15 in which screen display data is stored and the display 4 are connected to the display controller 14.

When the power turns on after the game cartridge 3 is set into the game instrument, the CPU 10 reads specified screen data and sends it to the display controller 14. Then, the CPU 10 writes programs and the PCM wave data in the DRAM 13, for generating the tone signal data with the sound effects and the BGM (Background Music) tone signal data. After that, the game program is started by operation of the controller 2, and the re-writing of the screen data and the generating of the tone signal data with the sound effects and the BGM tone signal data are performed. The progress control of the game program, i.e., re-writing of the screen data, is carried out directly by the CPU 10.

Figure 2:
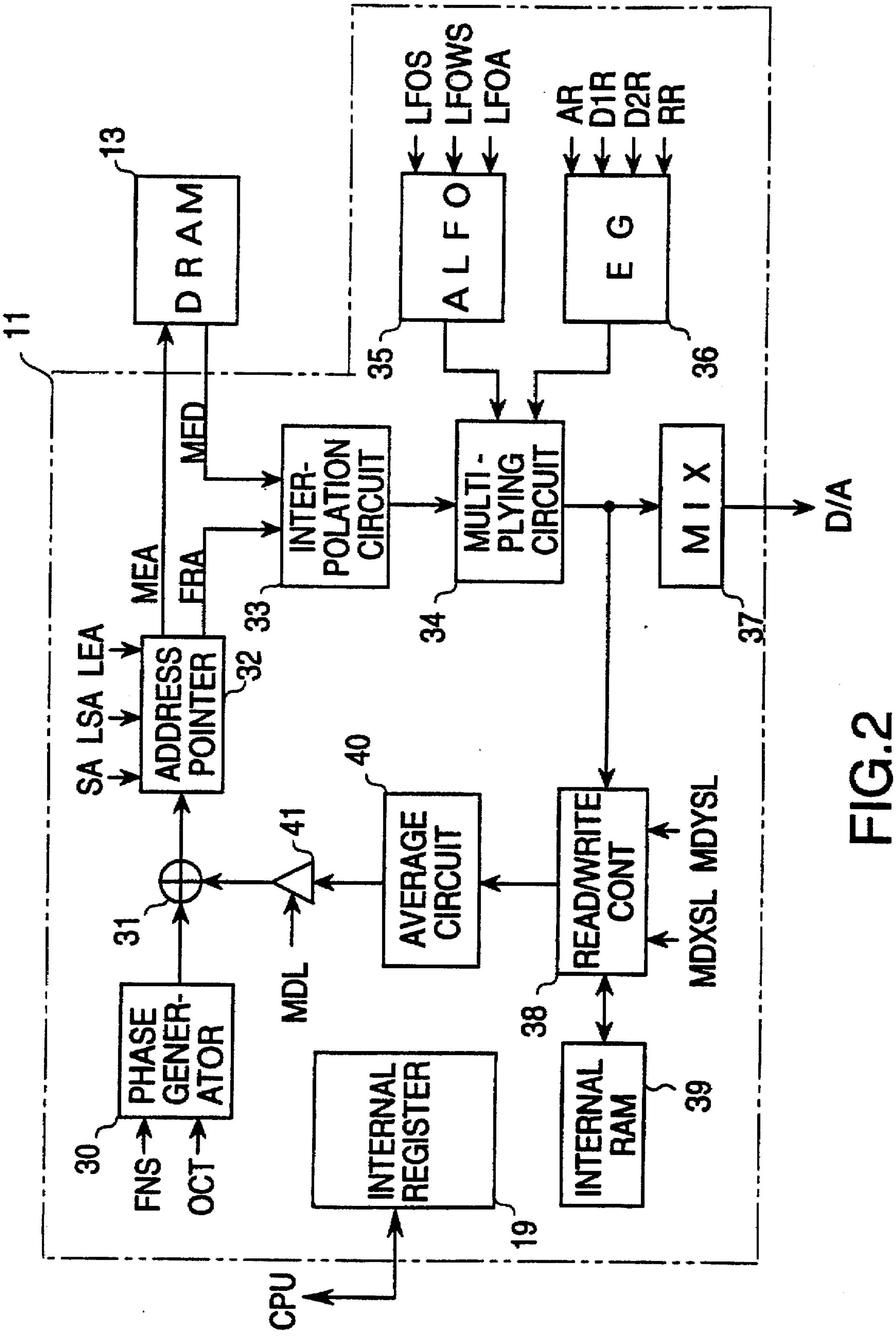
FIG. 2 is a block diagram of the tone signal generator LSI.

FIG. 2 is an internal block diagram of the tone signal generator LSI 11.

The tone signal generator LSI 11 is equipped with a phase generator 30, an adder 31, an address pointer 32, an interpolation circuit 33, a multiplying circuit 34, a low frequency oscillator for amplitude modulation (ALFO) 35, an envelope generator (EG) 36, an output mixing circuit (MIX) 37, a read/write controller 38, an internal RAM 39, an average circuit 40, and a coefficient multiplying circuit 41. The tone signal generator LSI 11 can generate the tone signal data by two methods, a wave memory method and a Frequency Modulation (FM) method. The above described devices and circuits generate digital low frequency signal data, such as the musical tone signal data and modulation data, by a process described as follows. The tone signal generator LSI 11 has thirty two time-shared channels for generating thirty two sets of tone signal data at the same time.

The tone signal generator LSI 11 has an internal register 19 in which a plurality of areas, each of which is corresponding to each channel, are assigned. The CPU 10 sets data for tone generation and tone release into these areas which correspond to channels to be generated, at a specified timing. The phase generator 30 generates phase data every specified sampling cycle (for example, 44.1 kHz), according to FNS data which is corresponding to tone pitch name data set into the internal register 19 and to octave data OCT. This phase data is inputted into the adder 31. The modulation data can be inputted into the adder 31 from the coefficient multiplying circuit 41 by setting. When the modulation data is inputted into the adder 31 from the coefficient multiplying circuit 41, the adder 31 adds the modulation data to the phase data to output the added data to the address pointer 32. The modulation data, which is, for example, low frequency sine curve data, modulates the phase data to thereby shift back and forth the address data to be outputted from the address pointer 32. As a result, the tone signal data read from the DRAM 13 is modulated by the FM method.

The address pointer 32 reads start address data SA, loop start address data LSA, and loop end address data LEA, as specified data of the wave data (tone signal data) stored in the DRAM 13 from the internal register 19. The LSA and the LEA represent a section to be repeatedly read. The address pointer 32 decides an amount of an address increment based on the phase data inputted from the adder 31, and outputs the address data including decimal fraction data FRA. The fraction data FRA in the address data is outputted into the interpolation circuit 33, and the two sets of the integer address data MEA which sandwich the FRA are outputted to the DRAM 13.

The two sets of the MEA allow the DRAM 13 to output the two sets of the wave data, being adjacent each other. The wave data read from the DRAM 13 is inputted into the interpolation circuit 33. The interpolation circuit 33 generates the tone signal data by interpolating the two sets of the wave data according to the FRA inputted from the address pointer 32. The interpolation circuit 33 inputs the obtained data to the multiplying circuit 34.

Figure 6:
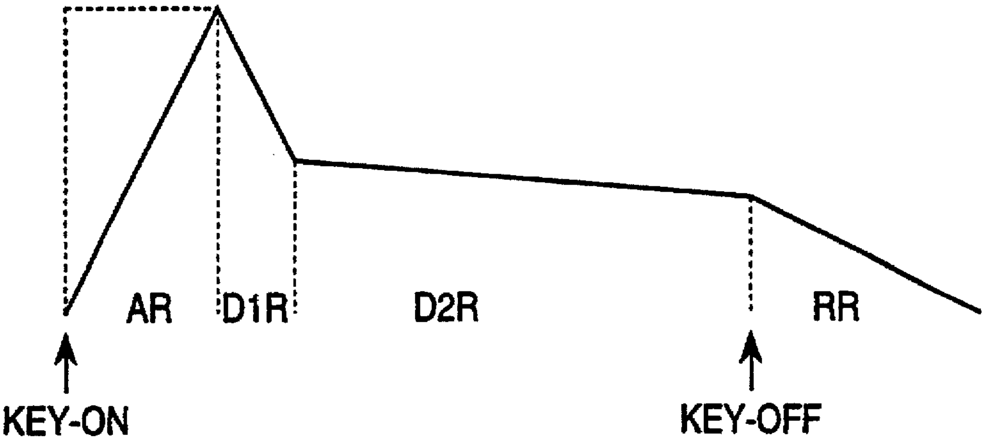
FIG. 6 shows an example of an envelope wave generated by an envelope generator which is arranged in the tone signal generator LSI.

The ALFO 35 and the EG 36 are connected to the multiplying circuit 34. The ALFO 35 generates signal data for modulation such as low frequency wave data as shown in FIG. 5 (FIGS. 5A to 5C) based on frequency data LFOA, wave specifying data LFOWS, and effect data (amplitude data) LFOS, which are read from the internal register 19. The EG 36 reads attack rate data AR, first decay rate data D1R, second decay rate data D2R, and release rate data RR from the internal register 19 to generate envelope wave data as shown in FIG. 6.

The multiplying circuit 34 multiplies the tone signal data outputted from the interpolation circuit 33 by the signal data and/or the envelope wave data described above, and thereby outputs the multiplied data to the output mixing circuit 37 and the read/write controller 38. The output mixing circuit 37 mixes the inputted data and divides the mixed data for two channels to output it to the D/A converter 16.

If the tone signal data is generated by the wave memory method, the wave data, which is available as it is, is read from the DRAM 13 to generate the tone signal data, and the envelope data is imparted to the generated tone signal data by the multiplying circuit 34 to output the data to the output mixing circuit 37. Therefore, signal data inputted into the read/write controller 38, i.e., signal data stored in the internal RAM 39, is not used.

While, the tone signal data used as an operator in the FM method, which is inputted from the multiplying circuit 34, is written into a specified area of the internal RAM 39 which is connected to the read/write controller 38. The internal RAM 39 has a area for two sets of sixty four words where the signal data for thirty two channels can be stored enough for two sample timings. The read/write controller 38 writes the signal data inputted from the multiplying circuit 34 into the specified area of the internal RAM 39, and reads one or two sets of the signal data designated by an algorithm in the FM method from the internal RAM 39 at a time-shared timing of a specified channel to output the obtained data to the average circuit 40. Modulation-data specifying data MDXSL and MDYSL, which are stored in the register (see FIG. 3) for every channel, are used for specifying what data is read at each time-shared timing. The MDXSL and the MDYSL specify an algorithm in generating the tone signal data by the FM method. That is, the MDXSL and the MDYSL allow tone signal data in a plurality of channels to be associated, thereby being capable of constituting algorithms as shown in FIG.4 (FIGS. 4(A) to 4(C)). The average circuit 40 is a circuit in which the average data of the two sets of the tone signal data is calculated when the tone signal data is read from the read/write controller 38. In this average circuit, any desired average method, such as an arithmetical average one, a geometrical average one and a waited average one, can be used. The averaged data is inputted into the coefficient multiplying circuit 41 to be multiplied by modulation level data MDL, and thus multiplied data is inputted into the adder As shown in FIG. 4A, in the case where the phase data (frequency data to read the tone signal data) is successively modulated from the channel "0" to the channel "3", the tone signal data in the channel "0" is once stored into the internal RAM 39, and the tone signal data is supplied to the adder 31 at the process timing of the channel "1". The process is carried out repeatedly un till the channel "3", and the tone signal data in the channel "3" is outputted to the output mixing circuit 37 as the musical tone signal data.

As shown in FIG. 4B, in the case where the tone signal data in the channel "0" is added to the tone signal data in the channel "1", and the phase data of the channel "2" is modulated by the added data, two sets of the tone signal data of the channel "0" and the channel "1" are once stored into the internal RAM 39, and these sets of the data are read at the process timing (time-shared timing) of the channel "2" to output the data to the average circuit 40.

Further as shown in FIG. 4C, in the case where the tone signal data generated by the channel "0" is returned to itself by a feedback loop to modulate the phase data thereof, the tone signal data in the channel "0" is once stored in the internal RAM 39, and the data is inputted into the adder 31 at the next or a later process timing of the channel "0".

Therefore, in case that the phase data in a presently processed channel is modulated, the tone signal data is stored in advance as the modulation data in the internal RAM 39, and the tone signal data is read at a process timing of the channel which is associated with the tone signal data to thereby output it to the adder 31.

Figure 3:
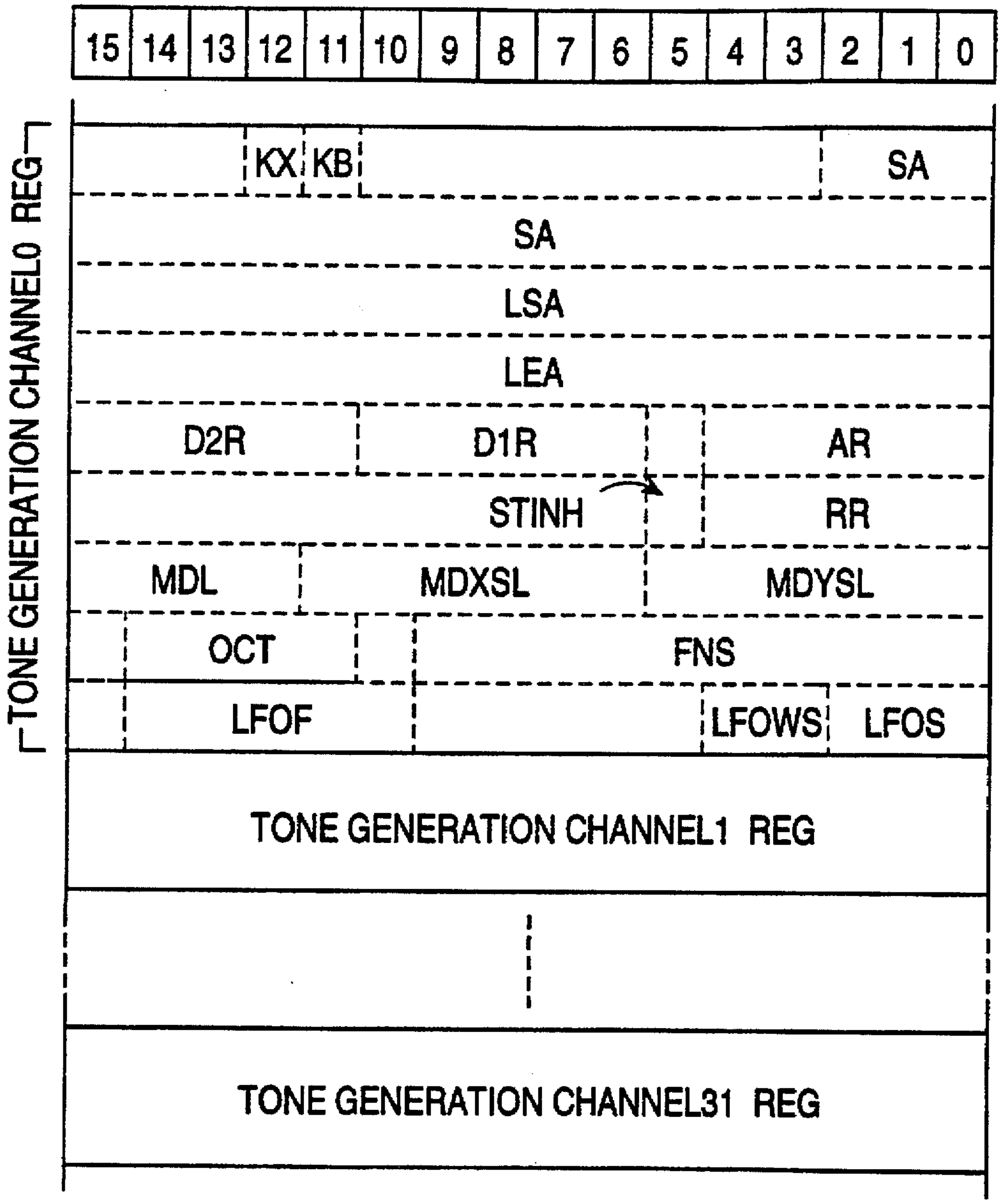
FIG. 3 shows a configuration of an internal register arranged in the tone signal generator LSI.
Figure 4A:
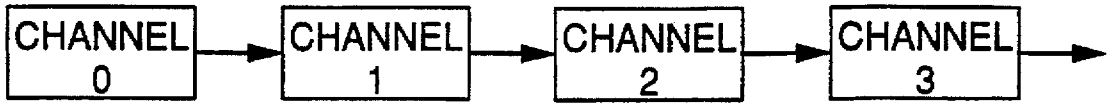
FIGS. 4(A) to 4(C) show examples of an algorithm for generating a musical tone signal, which is utilized in the tone signal generator LSI.
Figure 4B:
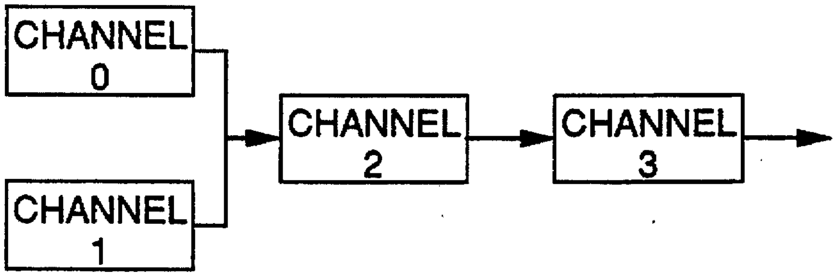
Figure 4C:
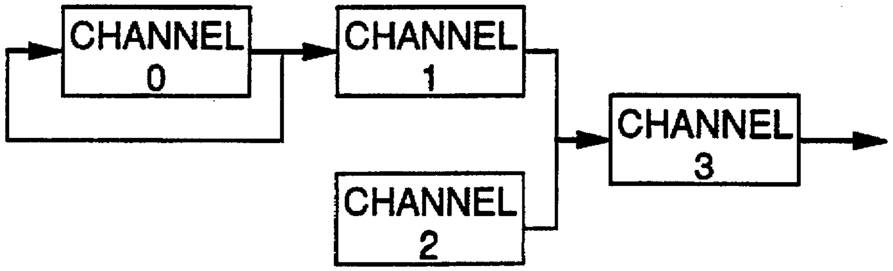
Figure 5A:
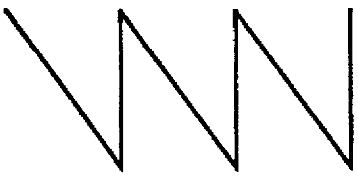
FIGS. 5A to 5D illustrate examples of a low frequency wave generated by the tone signal generator LSI and an internal ALFFO.
Figure 5C:
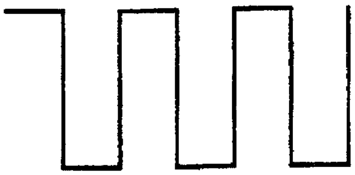
Figure 5B:
Figure 5D:
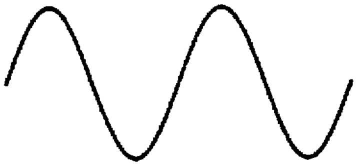

FIG. 3 is a configuration of the internal register 19. A register area of 16 bits * 9 rows is assigned to one channel, having various data storage areas represented in the description of FIG. 2. A generation/release bit KB and an execution bit KX are assigned at the 11th bit and the 12th bit in the first row.

If the generation in the channel "0" is instructed, various data is written into the register of the channel "0", and "1" is set into the KB of the register. Also, "1" is set into the KX if only the channel is generated. While, if any other channels together with the channel "0" are generated, "1" is set into the only KB and various data is successively written into the registers of the channels. When the various data is written into the last register, "1" is set into the KX of the last register. Each channel starts generating of the tone signal data when either KX in the registers is set to "1", so that the setting of "1" to either KX causes the simultaneous generating of the tone signal data in all the channels of which "1" is set into the KB.

That is, the tone signal generator LSI 11 judges in each process timing of each channel as to whether the KB in the register of the channel is set to "1", and any KX in all the channels is set to "1" Therefore, each channel, when the KB in the channel is set to "1" and any KX in all the channels is set to "1", starts generating of the tone signal data and resets the KB. Also, the KX is reset at the next process timing of the channel if the KX of the channel is set. Then, the setting of "1" to either KX allows the all the channels in which the KB is set to "1" to generate within one sampling cycle, and since all the KBs are reset after starting the generation, every channel is not influenced by the generation.

It is possible to apply the present invention to a case of tone releasing as well as the generating. That is, when "1" is set into the KB in the presently generated channel, the channel becomes a tone release state immediately after either KX is set to "1".

It is possible to arrange the register KX in any other area in place of every channel area. In that case, there is room of one bit for every channel register, and then the CPU 10 has to perform the setting process of "1" to the KX at the different timing from the data setting timing to every channel register.

The internal register 19 is provided with the MDXSL, the MDYSL, the STINH and the MDL. The algorithm of the FM method is provided by the MDXSL and the MDYSL in a plurality of channels. For example, in the case where the algorithms shown in FIGS. 4(A) to(C) are provided, the channel number specifying as shown in FIGS. 7A to 7C is performed into the MDXSLs and the MDYSLs in the channels "0" to "3". That is, in the case where the algorithm shown in FIG. 4A is provided, as shown in FIG. 7A, the MDXSL and the MDYSL are set as follows:

channel "0": MDXSL—not specified, MDYSL—not specified channel "1": MDXSL—ch. "0", MDYSL—not specified channel "0": MDXSL—ch. "1", MDYSL—not specified channel "0": MDXSL—ch. "2", MDYSL—not specified In the case where the algorithm shown in FIG. 4B is provided, the MDXSL and the MDYSL are set as shown in FIG. 7B, and in the case where the algorithm shown in FIG. 4C is provided, the MDXSL and the MDYSL are set as shown in FIG. 7C. In the internal RAM 39, two sets of the tone signal data for two sampling cycles in the same channel are stored. It is possible to select a desired one between these sets of the data.

Since the tone signal generator LSI 11 has thirty-two channels, if every channel is used for the FM tone signal generation to generate one tone signal data by a combination of four channels, i.e., four operators, as shown in FIGS. 4(A) to 4(C), eight tones can be generated simultaneously. It is possible that a part of the thirty-two channels is used for the FM tone signal generation and the other is used for the wave memory tone signal generation. Also, a number of operators is not limited to four.

In the above described embodiment, the modulation data is inputted into the adder 31 which is arranged between the phase generator 30 and the address pointer 32, however on the contrary the modulation data is directly inputted into the address pointer 32 to thereby directly modulate the phase data.

As described above, because every channel performs the generation or the release of the tone signal data at the same time (within one sampling cycle) when the instruction data for executing is set and it is confirmed, even if a controller which sequentially processes, that is, the cpu 10 instructs sequentially the generation or the release in the channels, the generation or the release can be carried out at the same time. Particularly, in the case of generating in by the FM method, any drifting of the wave data doesn't occur since there is no time lag in every generation and release timing in the channels. Further, because when the instruction data for executing is set, all the channels where the instructions for performing are set start generating simultaneously, grouping of the channels in advance is not required, and therefore, a plurality of channels with a desired combination can be simultaneously generated by setting the instruction for performing to every channel to be generated.

Additionally, since the tone signal data in any channel can be selected as the modulation data by modulation data specifying means, any desired algorithm can be constituted to realize a very flexible FM tone signal generator. Also, the modulation to the phase data can be more complex by imparting the envelope data to the tone signal data used as the modulation data, and a more complex algorithm can be constituted by using a plurality of the tone signal data as the modulation data and modulating the phase data (the address data) to access the wave data memory, on the basis of the modulation data.

What is claimed is:

1. A tone signal generator comprising:

a plurality of tone generation channels to be processed in tone generating within one sampling cycle of the tone generating;

tone generation control data memory means for storing tone generation control data, which includes instruction data for instructing tone generation or tone release, for each tone generation channel, and for storing execution data for instructing execution of the tone generation or the tone release;

tone generation control data writing means for writing the tone generation control data and the execution data in the tone generation control data memory means; and execution means for executing the tone generation or the tone release for each tone generation channel, wherein when the instruction data for instructing tone generation or tone release is stored in the tone generation control data memory means corresponding to at least two selected tone generation channels, and the execution data for instructing execution of the tone generation or the tone release is stored in the tone generation control data memory means of at least one tone generation channel, the execution means simultaneously executes the tone generation or the tone release for each selected tone generation channel.

2. The tone signal generator according to claim 1, wherein said tone generation control data writing means writes the execution data in the tone generation control data memory means corresponding to a last tone generation channel of all the tone generation channels to be processed.

3. The tone signal generator according to claim 1, further comprising modulation means for modulating a first tone signal data in a tone generation channel to be processed by a second tone signal data in another tone generation channel to be processed.

4. The tone signal generator according to claim 1, wherein the tone generation control data memory means includes a generation/release bit, which instructs tone generation or tone release, and an execution bit, which instructs execution of the tone generation or the tone release, for each of the tone generation channels, and when the generation/release bit is set for at least two selected tone generation channels and the execution bit is set for at least one of the tone generation channels, the execution means simultaneously executes the tone generation or the tone release for each selected tone generation channel to cause generating or releasing of tone signal data in all selected tone generation channels within one sampling cycle.

5. The tone signal generator according to claim 1, wherein the tone generation control data memory means includes a generation/release bit, which instructs tone generation or tone release, for each of the tone generation channels, and at least one execution bit, which instructs execution of the tone generation or the tone release, and when the generation/release bit is set for at least two selected tone generation channels and at least one execution bit is set, the execution means simultaneously executes the tone generation or the tone release for each selected tone generation channel to cause generating or releasing of tone signal data in all selected tone generation channels within one sampling cycle.

6. A tone signal generator comprising:

wave data memory means for storing wave data;

a plurality of tone generation channels to be processed in tone generating within one sampling cycle of the tone generating;

address data generating means for generating address data of the wave data memory means;

wave data read means for reading the wave data for each tone generation channel, by accessing the wave data memory means with the address data generated by the address data generating means, and for outputting the read wave data as tone signal data;

tone signal data memory means for temporarily storing the tone signal data; and address modulating means for modulating the address data generated by the address data generating means by the tone signal data stored in the tone signal data memory means.

7. The tone signal generator according to claim 6, wherein said tone signal data memory means stores a plurality of the tone signal data, each of which is outputted to a different tone generation channel, and the tone signal generator also includes tone signal data specifying means for specifying which of the tone signal data from among the plurality of the tone signal data stored in the tone signal data memory means is to be used by the address modulating means in the modulating of the address data.

8. The tone signal generator according to claim 6, wherein said address data generation means includes phase data generation means for generating phase data by accumulating numeral data corresponding to a frequency of the wave data to be read, and an address pointer for generating the address data based on the phase data, and said address modulating means includes adder means for adding the tone signal data stored in the tone signal data memory means to the phase data.

9. The tone signal generator according to claim 6, further comprising envelope data imparting means for imparting envelope data to the tone signal data, wherein said tone signal data memory means temporarily stores the tone signal data to which the envelope data is imparted.

10. The tone signal generator according to claim 7, wherein said tone signal data specifying means specifies a plurality of the tone signal data, and said address modulating means modulates the address data by the plurality of the tone signal data specified by the tone signal data specifying means.

* * * * *